United States Patent
Sutherland

(10) Patent No.: US 9,409,752 B2
(45) Date of Patent: Aug. 9, 2016

(54) METHOD AND APPARATUS FOR AN EMERGENCY LOWERING KIT

(71) Applicant: Electronic Power Design, Inc., Houston, TX (US)

(72) Inventor: Charles Sutherland, Houston, TX (US)

(73) Assignee: Electronic Power Design, Inc., North Houston, TX (US)

( * ) Notice: Subject to any disclaimer, the term of this patent is extended or adjusted under 35 U.S.C. 154(b) by 0 days.

(21) Appl. No.: 14/444,717

(22) Filed: Jul. 28, 2014

(65) Prior Publication Data

US 2015/0130375 A1    May 14, 2015

Related U.S. Application Data

(60) Provisional application No. 61/858,689, filed on Jul. 26, 2013, provisional application No. 61/859,867, filed on Jul. 30, 2013.

(51) Int. Cl.
| | | |
|---|---|---|
| *H02P 27/04* | (2016.01) | |
| *B66C 13/18* | (2006.01) | |
| *B66C 13/22* | (2006.01) | |
| *H02P 3/12* | (2006.01) | |
| *G05B 15/02* | (2006.01) | |
| *B66C 13/14* | (2006.01) | |
| *B66C 23/16* | (2006.01) | |
| *B66C 23/88* | (2006.01) | |

(52) U.S. Cl.
CPC .............. *B66C 13/18* (2013.01); *B66C 13/14* (2013.01); *B66C 13/22* (2013.01); *B66C 23/16* (2013.01); *B66C 23/88* (2013.01); *G05B 15/02* (2013.01); *H02P 3/12* (2013.01)

(58) Field of Classification Search
CPC ............ B66C 13/22; B66C 15/00; H02P 3/12
USPC .......................................................... 318/380
See application file for complete search history.

(56) References Cited

U.S. PATENT DOCUMENTS

| | | | | |
|---|---|---|---|---|
| 5,875,281 | A * | 2/1999 | Thexton et al. | 388/801 |
| 6,064,162 | A * | 5/2000 | Bowers | 318/246 |
| 7,148,652 | B2 * | 12/2006 | Ghanemi et al. | 318/805 |
| 2003/0057916 | A1 * | 3/2003 | Davis et al. | 318/800 |

* cited by examiner

*Primary Examiner* — Erick Glass
(74) *Attorney, Agent, or Firm* — G. Michael Roebuck, PC

(57) ABSTRACT

A method and apparatus are disclosed for lowering a load on a direct current hoist motor during an electrical power interruption, the method including but not limited to determining in a crane processor that the electrical power interruption has occurred; and providing a brake assist current to shunt field on the direct current hoist motor to produce a counter torque in the hoist motor.

10 Claims, 6 Drawing Sheets

METHOD AND APPARATUS FOR AN EMERGENCY LOWERING KIT

CROSS REFERENCE TO RELATED APPLICATIONS

The present application claims priority from U.S. Provisional Patent Application Ser. No. 61/858,689 filed on Jul. 26, 2013 and entitled a System and Method for a Modular Retrofit Crane and 61/859,867 filed on Jul. 30, 2013 and entitled A Method and Apparatus for a Modular Jack Up Rig Assembly, which are hereby incorporated by reference in their entirety.

BACKGROUND OF THE INVENTION

Older pedestal cranes on offshore jack up oil rigs become inoperable over time and need to be replaced. The replacement process can be time consuming and expensive caused excessive oil rig down time.

SUMMARY OF THE INVENTION

A method and apparatus are disclosed for lowering a load on a direct current hoist motor during an electrical power interruption, the method including but not limited to determining in a crane processor that the electrical power interruption has occurred; and providing a brake assist current to shunt field on the direct current hoist motor to produce a counter torque in the hoist motor.

DETAILED DESCRIPTION OF THE INVENTION

Figure 1:
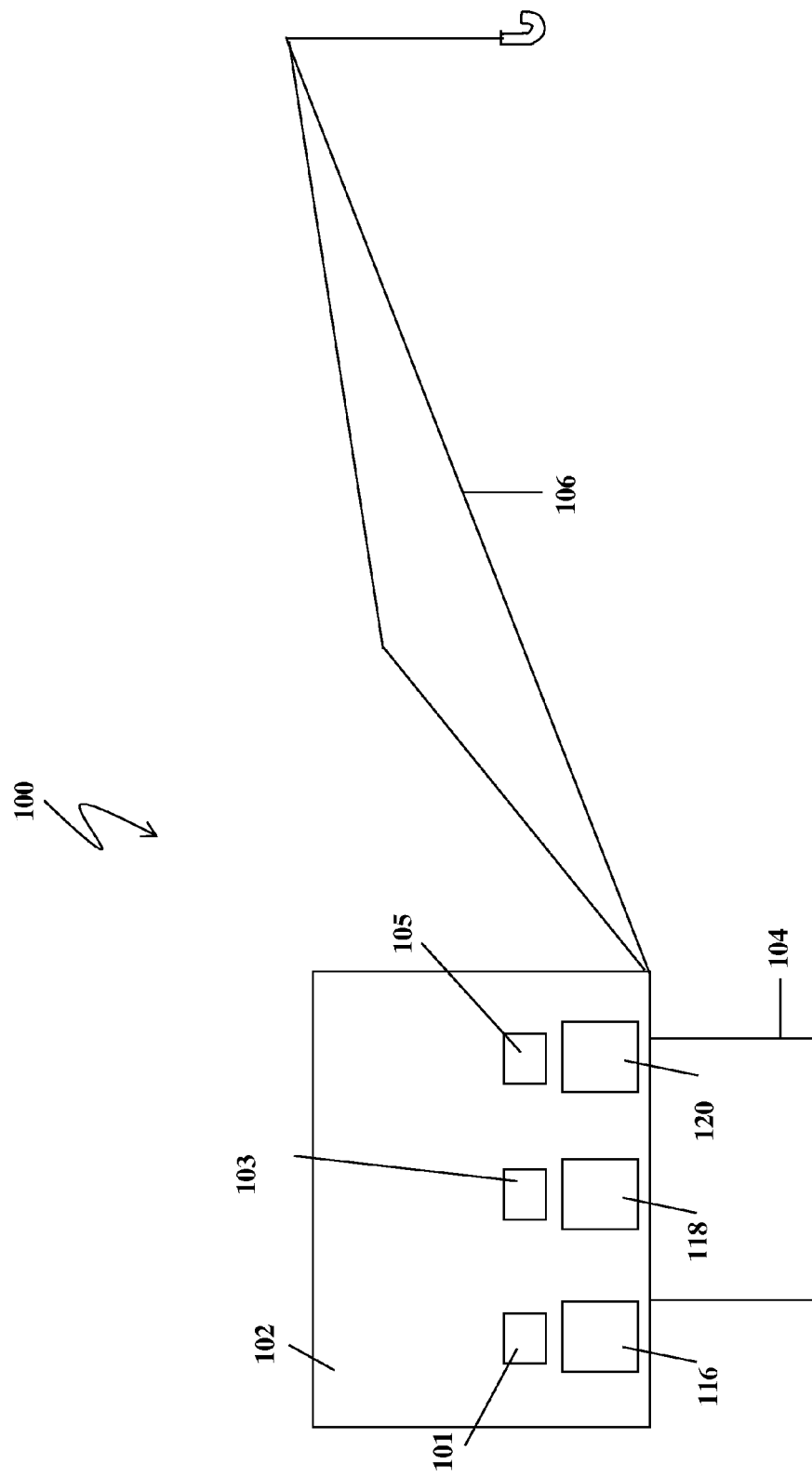
FIG. 1 depicts a prior art pedestal crane.

In a particular embodiment of the present invention replaces a LeTourneau pedestal crane with a retro fit crane kit provided by the present invention. The La Tourneau pedestal crane provides a motor generator set with open wiring. Replacement of the Le Tourneau pedestal crane with similar technology is time consuming and inefficient. Prolonged time spent in replacement can result in extended and expensive down time for an off shore jack up oil rig on which it is located. In a particular embodiment the present invention enables rapid upgrading of a LeTourneau pedestal crane without excessive rig down time when performed during a brief rig outage for an event such as a one week jack up rig relocation.

In a particular embodiment, the present invention can include but is not limited to functional modules to upgrade the existing pedestal crane. Providing the functional modules employing digital control, the present invention provides an upgrade package as a versatile way to upgrade older existing pedestal crane equipment and improve safety, operation, and serviceability for the existing pedestal crane. Many of the older existing pedestal cranes such as the LeTourneau pedestal crane use motor generators to control the pedestal crane.

In a particular embodiment of the present invention, digital control components enable the functions of the system to be tuned or modified to respond as desired. An illustrative embodiment of the invention provides an ability to expand existing input output interfaces provided by retrofit crane package in an illustrative embodiment to include additional sensors, add additional alarms, or be configured to meet an end user's specific requirements.

In a particular illustrative embodiment, the present invention provides a system and method to enable installation, supervision and commissioning of in retrofit pedestal crane upgrade package. In an illustrative embodiment a hook load instrumentation panel is provided along with a high speed starter for boom motor, additional options including a crane spare parts kit, split cabin consoles, an auxiliary hook control, a dual console configuration and a laptop computer with software & communication hardware.

In a particular illustrative embodiment, safety is built into the system and method by providing an easily connected enclosed equipment and wiring harness which creates a safer machinery space by eliminating open wiring which exposes rig maintenance personnel to electrical shock risk. In the past, serviceability has been a problem when it comes to the machinery space of a pedestal crane. With exposed electrical cables and components throughout the entirety of the interior space of the pedestal crane, thus requiring that electrical power to be removed for safe access into the interior area of the pedestal crane being replaced. This removal of power creates problems for crane maintenance personnel trying to troubleshoot an electrical problem.

In another illustrative embodiment of the present invention, all electrical components are housed in stainless steel enclosures to prevent accidental electrical shock from exposed wiring. In a particular illustrative embodiment, a programmable logic controller (PLC) master control panel communicates with the control console and silicon controlled rectifier (SCR) drives, as well as monitor the cranes various sensors and switches. It also monitors the health of the system and gives maintenance personnel a central diagnostic interface.

In an illustrative embodiment, at least one control console is provided which is provided with a Remote input and output (I/O) rack in the control console(s), the operator control, indication, and alarming is controlled from the PLC caster control panel. Hoist and slew converter panels are also provided. In a particular illustrative embodiment hoist motors and slew motors are provided and powered by a plurality of Siemens 6RA70 DC master drives, some of the latest developments in digital DC drive technology. These DC drives provide regenerative braking, and are programmed with torque proving and "fail safe" brake control logic for added safety. Hoist, boom and slew motor junction-boxes are provided for a local connection point for the motor leads, gone is the hassle of dealing with a ball of rubber and electrical tape.

In the event of a power interruption, safety is the number one concern. The hoist resistor grid also referred to herein as a "braking resistor" is provided for safety. The circulating currents from the motor will be redirected to the hoist resistor grid, which will aid the electric brake in bringing a hanging load. A replacement boom AC starter is provided for single or two speed operation. In an illustrative embodiment, the incoming power feeds for the equipment are inside of closed equipment enclosure such as a surge suppression panel to enhance safety. The surge suppression panel does much more than that. It also absorbs the voltage spikes, which can damage the equipment and possibly cause an unsafe condition.

An illustrative embodiment of the system and method of the present invention provides a substantially complete system solution enabling real added value in upgrading a pedestal crane. The package is designed to use many of the existing pedestal crane cables, distribution, and lighting panels, thus reducing cost of the installation.

A step by step computer generated instruction manual includes guidelines for identifying the cables and components that stay and the ones that go during the remove and install retrofitting process. This work on the front end speeds up the entire process. The computer generated retrofitting instructions comprising audio, video and text in a native language selectable by the view takes an operator through the entire procedure of retrofitting and commissioning an existing pedestal crane. The computer generated instructions, discussed below in conjunction with FIGS. 4, 5 and 6 assist an operator in with identifying equipment and steps in the retrofitting process and what to do with it from start to finish. Since the method and apparatus of the present invention system are programmed and tested at the factory, the computer generated instruction manual also demonstrates you how to commission pedestal crane after the retrofitting is complete.

In the past crane kit retrofit installations have been complex operations requiring the interconnections of hundreds of parts used to replace or retrofit an existing pedestal crane on a jack up rig. The present invention preassembles components into modular sections into a crane retrofit kit so that there is an order of magnitude less complexity to assemble the crane retrofit kit once the crane retrofit kit arrives at a foreign destination. The modular retrofit kit comprises sealed enclosed equipment enclosure modules which are tested and sealed and then certified during manufacture. The certified modules are then shipped to a foreign destination where the sealed modules are connected together for a simplified assembly. The simplified modular approach helps to overcome the limitations of language barriers and available documentation during assembly at a foreign destination on a jack up rig or a ship.

An emergency lowering kit is provided as an alternative method and apparatus for lowering a crane's suspended load in the event that the main power to the crane is interrupted. By utilizing stored energy in a battery bank, the crane hoist brake coils can be energized to allow for a safe and controlled decent of the load. The brake contactor in an emergency lowering control panel is electrically interlocked with a main brake contactor in the hoist converter panel to prevent inadvertent connection of the main AC power to the DC battery bank.

Turning now to FIG. 1, FIG. 1 depicts a schematic drawing of an existing pedestal crane that has aged and deteriorated and is in need of a retrofit. In an illustrative embodiment of the invention an EPDL120 Crane Kit is provided as an upgrade package designed to retrofit the controls of a LeTourneau PCM-120 pedestal crane 100. The existing controls of a LeTourneau PCM-120 crane consist of DC motor-generator sets 101, 103 and 105 with a power conversion scheme capable of powering the hoist motor 120 and slew motor 116 and boom motor 118. The hoist motor 118 and slew motor 116 and boom motor 120 are located inside of crane housing 102.

Figure 2:
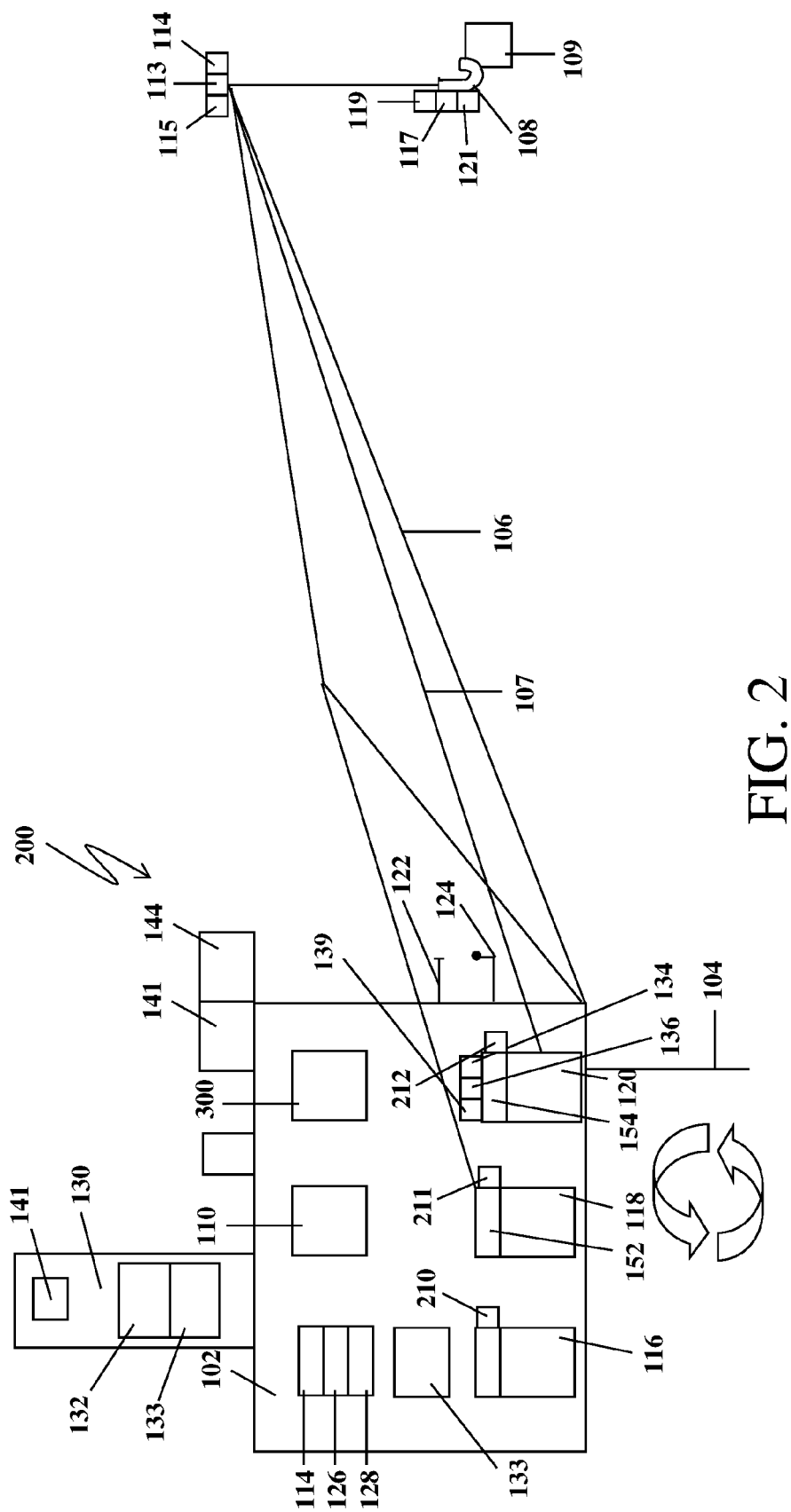
FIG. 2 depicts an illustrative embodiment of the present invention, showing a pedestal crane after a retrofit in a particular embodiment of the invention.

Turning now to FIG. 2, FIG. 2 depicts an illustrative embodiment of the present invention, showing a particular embodiment of a pedestal crane after a retrofit. As shown in FIG. 2, in a particular embodiment of the present invention, an EPDL120 crane kit is provided that replaces the motor-generator sets 101, 103 and 105 controllers of the existing pedestal crane. The motor-generator sets are replaced by digitally controlled SCR drives. SCR drive 150 is installed for the slew motor, SCR drive 152 is installed for the boom motor and SCR drive 154 is installed for the hoist motor. The SCR drives are 4 quadrant maintaining the ability to power the motors in either direction and electrically brake the motors. In particular illustrative embodiment, a system and method are provided to perform functions to substantially prevent commutation failure. The hoist converter and slew converter both measure the AC line voltage. If the AC line voltage is too low, the SCR drive will not regenerate power to the AC line. In a particular embodiment, reactors are installed across the hoist, boom and slew DC motors to improve the performance of the hoist, boom and slew DC motors.

In a particular illustrative embodiment, a crane processor 114, a non-transitory computer readable medium 126 and display 128 are provided inside of the crane housing 102. A computer program comprising instructions stored in the non-transitory computer readable medium 126. In a particular embodiment, the hoist converter 154 is in data communication with the crane processor 114. In one particular embodiment of the invention, data communication performed over a wireless wireless fidelity (WIFI) network. In another embodiment data communication performed over a combination of a hard-wired and a wireless WIFI network. In one particular embodiment of the invention, the crane processor is data communication with the hoist SCR drive 154. In the present patent application, the phrase "data communication" is used to mean that data is exchanged between two devices that are in data communication over a wireless or hard wire communication link. When the hoist SCR drive is not able to be activated for any reason (such as the supplied input AC line voltage being supplied to the hoist SCR drive is too low), a spring loaded fail-safe brake switch 136 is provided that closes to engage a brake when power is not applied. The spring closes and engages a mechanical brake 134. The engaged mechanical brake on the hoist motor substantially stops rotation of the hoist motor to substantially discontinue up and down motion of a load 109 suspended from the hoist hook 108. In particular illustrative embodiment, when power interruption occurs, a braking resistor 139 is automatically connected across terminals of the hoist motor by the normally closed fail-safe brake switch. The braking resistor provides a dynamic braking counter torque in the hoist motor in the case of a power interruption when the power interruption occurs when the crane is loaded, that is during a lifting or lowering operation of a load 109 suspended from hoist hook 108 and hoist line 107. In a particular embodiment of the invention, a plurality of accelerometers are provided and installed. A first three axis digital accelerometer 113 is installed on the distal end, i.e., crane boom 106 tip and a second three axis accelerometer 117 is installed on the hoist hook. In a particular embodiment, wireless data communication, comprising data exchanged between the processor and other electronic equipment inside and outside of the crane housing, occurs between the crane processor and accelerometers 113 and 117.

The first accelerometer is provided and installed for monitoring, the displacement, velocity and acceleration of the distal end of the crane boom 106. The second accelerometer is provided and installed for monitoring and the displacement, velocity and acceleration of the hoist hook. In another particular embodiment, wind speed is measured by an anemometer 141 mounted on top of the crane housing 102. In another particular embodiment, wave height and direction is measured by a wave measuring buoy (not shown) that is deployed near the pedestal crane location. Wireless data transmission elements 115, 121, 131 and 144 are installed to provide data communication between the crane processor, the operator console, the accelerometers and the anemometer.

The crane processor computer program embedded in the non-transitory computer readable medium provides overall data acquisition, logging and display. Data is sent by sensory elements, including but not limited to the accelerometers, switch closures, anemometer readings (wind speed and direction), SCR drive state data (on, off), brake assist data (on, off, current level, brake assist resistor value), braking resistor data (on, off, current level, brake assist resistor value) and operator inputs to the crane processor. The data is displayed on the crane processor display 128 screen inside the crane housing 102. The crane processor monitors accelerometer 113 to determine crane boom velocity and acceleration. Hoist hook velocity and acceleration are monitored by the crane processor computer program. In a particular illustrative embodiment, the crane processor computer program performs peremptory corrective action when one or more monitored values from the sensory elements reaches a predefined maximum or minimum allowed value. Monitored values are presented by the crane processor to a crane operator in real-time. Monitored data are sent over a wireless link to the crane processor and an operator processor 132 on a crane operator display 133 on a crane operator console 135 in a crane operator cabin 130. In another particular embodiment, wind speed and direction are measured by an anemometer 141 installed on the crane housing. The measured wind speed and direction are sent to the crane processor over the wireless link. Rechargeable batteries attached to photovoltaic cells 114, 144 and 121 are provided to recharge and power the accelerometers and anemometer. The batteries provide electrical power to the anemometer, accelerometers and wireless communication transmitters/receivers installed on the crane boom tip and the hoist hook.

Accelerometer 113 is mounted on the boom tip to provide boom tip velocity oriented outputs acceleration data to the processor indicates boom tip velocity and boom tip acceleration. When either the boom tip velocity or acceleration exceeds a predetermined value the crane processor intercedes by sending a command to implement peremptory corrective action by slowing down or braking the boom motor. Accelerometer 117 is mounted on the hoist hook to provide hoist hook velocity and acceleration data to the processor indicates boom tip velocity and acceleration. Hoist hook acceleration is an indication of load lowering velocity and acceleration. Thus, if the hoist hook acceleration exceeds a predetermined value the crane processor intercedes by sending a command to implement peremptory corrective action by slowing down or braking the boom motor.

Figure 3:
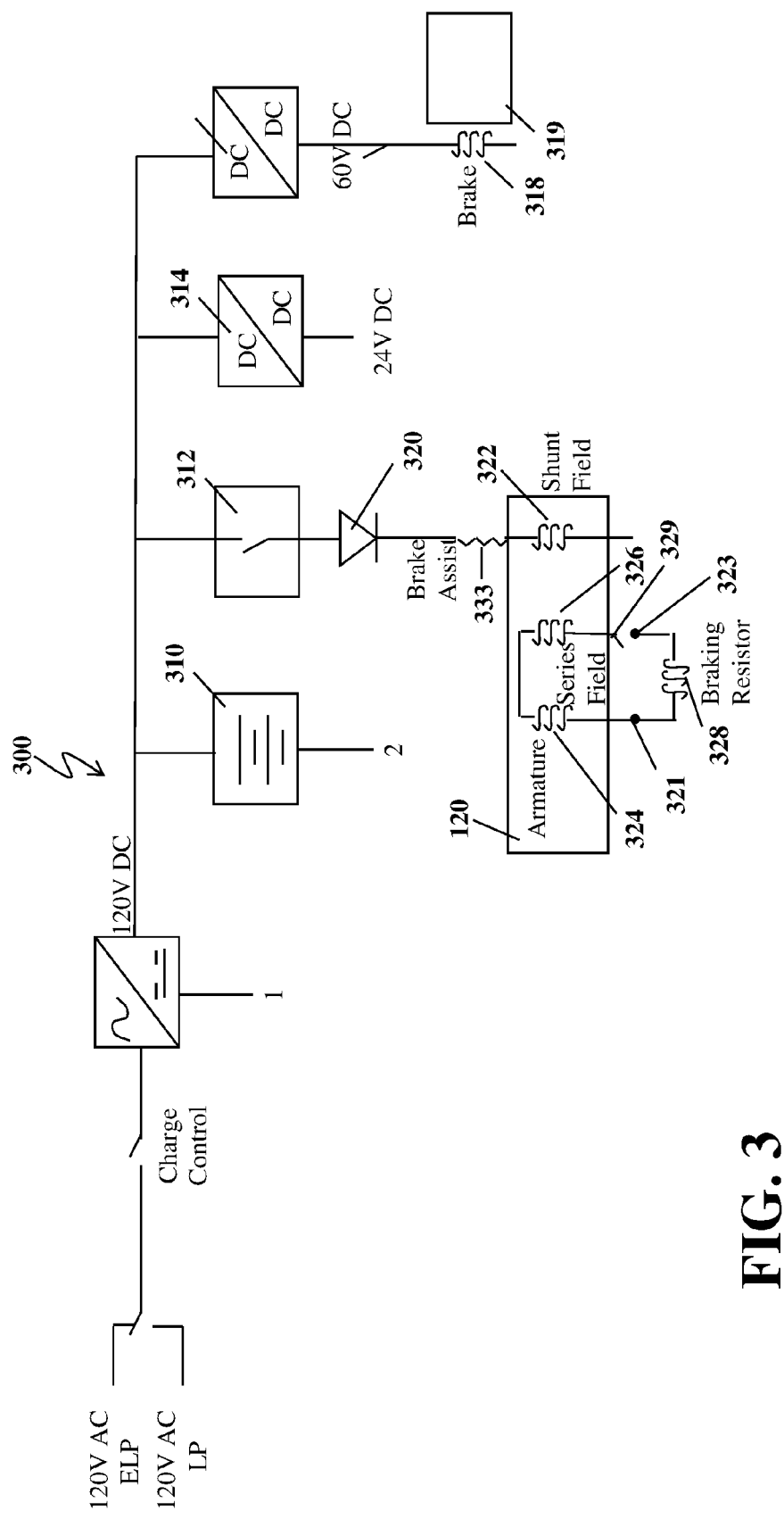
FIG. 3 depicts a particular embodiment of a braking resistor in an illustrative embodiment of the present invention.

FIG. 3 depicts an illustrative embodiment of the present invention, showing a particular embodiment of a braking resistor. Turning now to FIG. 3, a more detailed schematic drawing of a particular illustrative embodiment of the emergency lowering kit 300 is depicted in a schematic. In a particular embodiment of the invention, hoist motor leads 321 and 323 are wired into a hoist motor junction box 341. The junction box 341 comprises a switch enclosure for automatically connecting the braking resistor 328 across the hoist motor leads 321 and 323. A similar junction box is provided for the boom and slew motors. In another embodiment, the braking resistor and emergency lowering kit method and apparatus are provided for the slew motor. In another embodiment, the braking resistor and emergency lowering kit method and apparatus is provided for the boom motor. When electrical power to the crane hoist motor is lost, the crane processor maintains power via a rechargeable back up battery 310. When power is lost the hoist brake 319 which is spring loaded to be normally closed or engaged when power is not applied, engages to substantially stop rotation of the hoist motor and the associated descent of the load attached to the hoist hook to prevent an accident from the load free falling during a power interruption. In a particular embodiment a brake release push button is provided to enable an operator to manually activate. A back up battery 310 is provided to energize brake relay 318 via a wireless data link to release the hoist brake 319 to allow the hanging load suspended from the hoist hook to be lowered safely. In another particular embodiment, during a power interruption the processor senses a power interruption and provides a command over a wireless connection to sends the command to energize the switch 331 to place the braking resistor 328 across the terminals 325 and 327 of the hoist motor. In a particular illustrative embodiment, the hoist motor is a compound DC motor having an armature and field winding wired in series and a shunt field. A switchable reversing rectifier circuit is wired between the armature and field winding to enable reversal of the hoist motor direction of rotation.

During the power interruption, the crane processor uses provides back up battery 310 to energize brake relay 318 via a wireless data link to release the hoist brake 319 to allow the hanging load suspended from the hoist hook to be lowered safely. During a power interruption the processor uses a wireless connection to send a command to energize a switch 331 to connect the braking resistor 328 across the terminals 325 and 327 of the hoist motor inside of a sealed junction box. When the brake is released during a power interruption, the weight of the load on hoist hook, which is connected to the hoist motor, causes the hoist motor to "freewheel" or spin freely. This freewheeling during a power interruption turns the hoist motor into a generator. The freewheeling hoist motor generates voltage and thus current flow through the braking resistor thereby dumping energy into the braking resistor producing a counter torque to resist the rotation of the freewheeling hoist motor. The faster the hoist motor spins during freewheeling, the more voltage and current hoist motor generates. The voltage generated by the freewheeling hoist motor thus limits the rotation of the hoist motor and the speed at which a load hanging on the hook attached to the hoist motor descends for the hanging position.

The crane processor runs on backup power during a power interruption and stays in data communication with the variable resistance braking resistor 328 and the emergency lowering kit 300 and variable resistance brake assist resistor 333. The braking resistor 328 is disconnected during normal crane hoist motor operations. When the In a particular illustrative embodiment of the invention, an emergency lowering kit 300 is provided to help safely lower a load hanging from hook 108 during a power outage when the power to the hoist motor is unexpectedly interrupted during a crane operation. The emergency lowering kit is schematically depicted and discussed below in conjunction with FIG. 3. If such a power interruption failure occurs, the crane processor automatically closes switch 329 to engage the braking resistor 328. The braking is automatically switched in across the hoist motor terminals. The braking resistor 328 provides a path for current from the DC hoist motor 120. The current produces motor counter torque that assists in braking the hoist motor during a power loss to allow a more controlled descent of a load left hanging from the hoist hook attached to the hoist motor during a power interruption.

In another particular embodiment of the invention, during an unexpected power interruption, the crane processor provides a wireless command to energize and close a brake assist switch 312 to provide an electrical current from the back up battery 310 through rectifier 320 to a shunt field 322 on the hoist motor 120. In another particular embodiment, the brake assist resistor 333 is a programmable variable resistor is placed in series with the backup battery to control the amount of current supplied to the shunt field. The crane processor controls the value for the variable resistance brake assist resistor 333. The brake assist switch closure provides a path from the rechargeable back up battery 310 to the hoist motor shunt field 322 and injects additional current into the hoist motor by injecting current into the hoist motor shunt field to generate additional hoist motor counter torque to further assist in braking the hoist motor during a power interruption to gently lower a load on the hoist hook. In a particular embodiment, the crane hoist motor is a compound motor having an armature field and a series field wired in series.

The crane hoist motor additionally has a shunt field. In a particular embodiment the shunt field uses 75 percent of the hoist motor current. When the hoist brake is released, the load on the hoist hook is allowed to freefall. During freefall the hoist motor freewheels (spins freely) due to weight of the load on the hoist hook. The freewheeling hoist motor produces a current at terminals 321 and 323 that is dumped into the braking resistor 328 when the braking resistor switch 329 is closed. A counter torque is produced by the freewheeling hoist motor. The boom motor is equipped with an emergency lowering kit also to allow controlled lowering of the boom during a power outage.

In a particular embodiment, safety features are provided by the processor. When the crane processor determines that the boom up relay is energized and both of the first boom upper limit switch 124 and the second boom upper limit switch 122 are activated, an Emergency Stop is initiated by the crane processor after 0.5 seconds. When the crane processor determines that the boom up contactor is energized without the boom up command issued, an Emergency Stop command is initiated by the crane processor after 0.5 seconds. When the crane processor determines that boom down contactor is energized without the boom down command issued, an Emergency Stop is initiated by the crane processor after 0.5 seconds. When the processor determines that the slew drive is driving left and the both the first and second left limit switches are activated, an Emergency Stop is initiated by the processor after 0.5 seconds. When the crane processor determines that the slew drive is driving right and both the first and second right limit switches are activated, an Emergency Stop is initiated by the processor after 0.5 seconds. When the hoist drive is driving up and the upper limit switch is activated, an Emergency Stop is initiated after 0.5 seconds. In a particular illustrative embodiment, a Surge suppression module is provided in the crane housing to protect against voltage spikes on the hoist, boom and slew motors and crane processor and other electronics and electrical devices described herein (hereinafter the "crane electronics") and provided in a particular embodiment of the present invention. In a particular illustrative embodiment, the equipment and crane electronics are protected in NEMA 4x enclosures.

The hoist resistor grid (also referred to as "braking resistor") aids the hoist motor brake during a power failure. Ground fault monitoring of the 120V power is implanted. In a particular embodiment, the crane electronics, communication devices and wireless communication devices are provided with a separate uninterruptable power supply. In another particular embodiment, the crane electronics are provide with their own power supply isolated from all I/O circuits. The hoist controls provide internal torque proving and brake control logic to prevent load slipping. In another particular embodiment, faulty upper, lower, left and right limit switches can be quickly bypassed using keyed switches to allow operation of the crane. In another particular embodiment the first limit switch is provided with a contact arm that opens a normally closed limit switch. In another particular embodiment of the invention the first limit switch is a pair of limit switches wired in parallel, wherein the pair of limit switches comprise one normally open limit switch and on normally closed limit switch so that both the normally open limit switch and on normally closed limit switch must be activated to indicate that the boom has activated of the first limit switch. In another particular embodiment, the second limit switch comprises an inductive proximity sensors that activates when the boom travels close enough to the second limit switch to activate the inductive second limit switch.

In another particular embodiment the braking resistor is a variable resistor that can be manipulated to provide more or less resistance proportional to the speed or descent of the load and hook as reported from the hook accelerometer. When the load is descending faster than a preprogrammed maximum hook velocity, the resistance of the variable braking resistor on the hoist motor is increased to slow down the velocity of the descending load attached to the hook. In another embodiment, when the load is descending slower than a preprogrammed minimum velocity, the resistance of the variable braking resistor is decreased to increase the velocity of the descending. In another embodiment a neural network is provided in the crane processor to monitor and learn maximum hook velocities at which prior operations have switched in the braking resistor, increased the resistance of the braking resistor. In another embodiment a neural network is provided in the crane processor to monitor and learn minimum hook velocities at which prior operations have switched in the braking resistor, decreased the resistance of the braking resistor. In a particular embodiment, the neural network automatically switches in the braking resistor to connect it across the terminals a hoist, slew or boom motor and sets the resistance of the braking resistor to the resistance value learned by the neural network for a measured value for the velocity of the hook.

In another particular embodiment, the computer program in the crane processor tests the first and second upper limit switches. The computer program periodically activates the crane boom motor to move to a position at which both first and second upper limit switches are activated to insure the first and second upper limit switches are in working order. The computer program will not allow crane boom operation when either of a first or second upper limit switches have not been tested or have been tested and a failure is indicated. In another particular embodiment, the computer program in the crane processor tests the first and second lower limit switches. The computer program periodically activates the crane boom motor to move to a position at which both first and second lower limit switches are activated to insure the first and second lower limit switches are in working order. The computer program will not allow crane boom operation when either of a first or second lower limit switches have not been tested or have been tested and a failure is indicated.

In another particular embodiment, the computer program in the crane processor tests the first and second right limit switches. The computer program periodically activates the crane slew motor to move to a position at which both first and second right limit switches are activated to insure the first and second right limit switches are in working order. The computer program will not allow crane slew motor operation when either of a first or second right limit switches have not been tested or have been tested and a failure is indicated. In another particular embodiment, the computer program in the crane processor tests the first and second right limit switches. The computer program periodically activates the crane slew motor to move to a position at which both first and second right limit switches are activated to insure the first and second right limit switches are in working order. The computer program will not allow crane boom operation when either of a first or second right limit switches have not been tested or have been tested and a failure is indicated.

In another particular embodiment, the computer program in the crane processor tests the first and second left limit switches. The computer program periodically activates the crane slew motor to move to a position at which both first and second left limit switches are activated to insure the first and second left limit switches are in working order. The computer program will not allow crane slew motor operation when either of a first or second left limit switches have not been tested or have been tested and a failure is indicated. In another particular embodiment, the computer program in the crane processor tests the first and second left limit switches. The computer program periodically activates the crane slew motor to move to a position at which both first and second left limit switches are activated to insure the first and second left limit switches are in working order. The computer program will not allow crane boom operation when either of a first or second left limit switches have not been tested or have been tested and a failure is indicated.

In another particular embodiment the brake assist current is varied by adjusting the resistance of a programmable variable brake assist resistor that is manipulated to provide more or less resistance. The brake assist resistance is adjusted by the crane processor to be proportional to the speed or descent of the hook as reported from the hoist hook accelerometer. When the load on the hoist hook is descending faster than a preprogrammed maximum hook velocity, the resistance of the variable brake assist resistor on the hoist motor is decreased to slow down the velocity of the descending load attached to the hook. In another embodiment, when the load is descending slower than a preprogrammed minimum velocity, the resistance of the variable brake assist resistor is decreased to increase the velocity of the descending load. In another embodiment a neural network is provided in the crane processor to monitor and learn maximum hook velocities at which prior operations have switched in the brake assist and decreased the resistance of the brake assist resistor. In another embodiment a neural network is provided as software embedded in the computer readable medium in the crane processor. The neural network monitors the inputs from sensory elements to store and process the inputs to learn minimum hook velocities at which prior operations have switched in the brake assist resistor and increased the resistance of the braking resistor. In a particular embodiment, the neural network automatically switches in the brake assist to add current to a shunt field of a hoist, slew or boom motor and sets the resistance of the brake assist resistor to the resistance value learned by the neural network for a measured value for the velocity of the descending hook.

In another particular embodiment, the crane processor further comprises a programmable logic controller (PLC). In another particular embodiment, a PLC master control panel communicates with the Control Console and the SCR Drives. It also receives and monitors sensors and safety limit switches. In another particular embodiment the PLC master control panel is enclosed in a sealed equipment enclosure that is cooled with an evaporative alcohol. The emergency lowering kit is also provided in a sealed equipment enclosure that is cooled with an evaporative alcohol cooling apparatus.

In another embodiment, a hoist converter panel is provided that powers the hoist motor. The hoist converter panel includes but is not limited to an SCR drive and drive controls and is also provided in a sealed equipment enclosure that is cooled with an evaporative alcohol chilling apparatus. In another particular embodiment, an auxiliary hoist converter panel is provided that powers a second auxiliary hoist DC motor. It contains and SCR drive and drive controls. In another particular embodiment a prefabricated wiring harness is provided to connect the sealed equipment enclosures to existing equipment in the crane housing during the remove and install retrofit process.

In another embodiment, a slew converter panel is provided that powers the slew motor. The slew converter panel contains and SCR drive and drive controls and is also provided in a sealed equipment enclosure that is cooled with an evaporative alcohol. In a particular embodiment, digital controls are provided in method and apparatus for a Pedestal Crane upgrade package which provides a versatile way to upgrade the equipment and improve the safety, operation, and serviceability of a Pedestal Crane. Digital control components allow the functions of the system to be tuned or modified. In an illustrative embodiment of the invention, the crane processor further provides for automatic assisting during Installation, Supervision and Commissioning of the retrofitting of a pedestal crane.

Serviceability has sometimes been a problem when it comes to the machinery space of a pedestal crane. With exposed cables and components throughout, the power has to be removed for safe access into the area. This creates problems for maintenance personnel trying to troubleshoot an electrical problem. In a particular embodiment of the invention an upgrade package comprising a remove and install retrofitting system and are provided in which the components are housed in stainless steel enclosures to prevent accidental shock.

Figure 4:
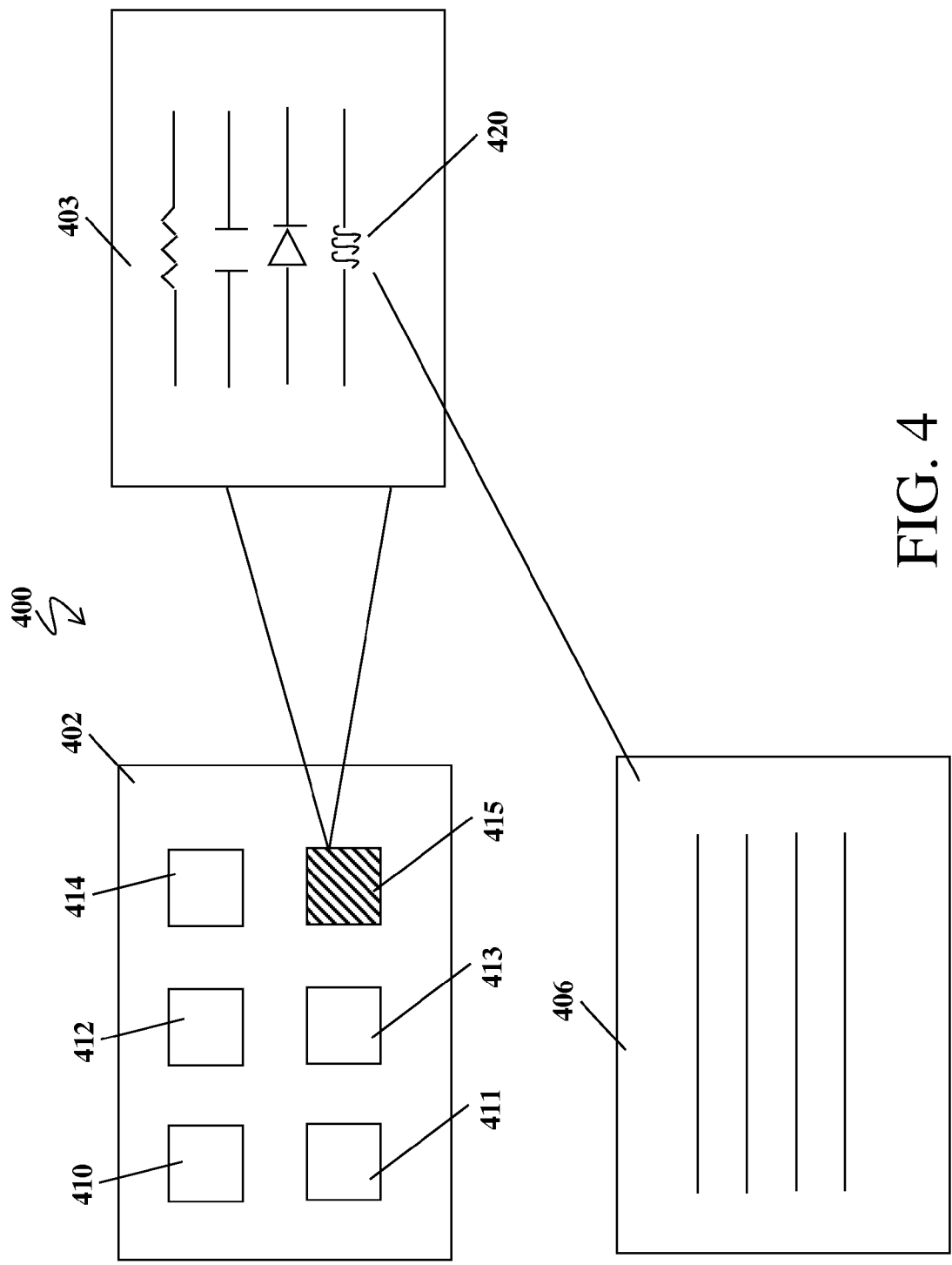
FIG. 4 depicts a particular embodiment of an automated drill down schematic in an illustrative embodiment of the present invention.

Turning now to FIG. 4, in a particular illustrative embodiment 400, the system and method of the present invention is designed to retain a substantial portion of the existing cables, distribution, and lighting panels, thus reducing cost of the installation. An online installation manual 420 is presented on the auxiliary computer display that guides installation personnel during the pedestal crane retrofit process. As shown in FIG. 4, in an illustrative embodiment, an automated retrofitting install and remove instruction manual 402 is provided that provides operator guidelines for identifying the cables and components that are retained and the components that are removed. This work on the front end speeds up the entire process. The automated installation manual is a computer program that is stored in a non-transitory computer readable medium of the crane processor and auxiliary crane processor. In a particular embodiment, the automated installation manual computer program is stored on the crane processor and displayed on a display and input device such a computer keyboard connected to the crane processor. In another particular embodiment, the automated installation manual computer program is stored on a non-transitory computer readable medium on an auxiliary installation processor and displayed on a display and input device. The input device is a computer keyboard connected to the auxiliary installation processor. In a particular embodiment the auxiliary installation processor is a tablet computer. In another embodiment the auxiliary installation processor is a smart phone.

As shown in FIG. 4, a block diagram 402 of components 410, 412, 414, 411, 413 and 415 of an equipment retrofitting procedure for an existing crane is shown on the auxiliary computer display. Installation personnel select a component 415 from the equipment retrofitting procedure which is expanded to depict a schematic component display 403 by the auxiliary installation processor and presented on the auxiliary installation processor display. A component 420 is selected from the schematic display and a bill of materials and installation instructions 406 are presented on the auxiliary computer describing the component is displayed. The bill of materials comprises a description of the components, the components inputs and outputs, equivalents and suppliers. In the present specification, the term "presented" is used to means rendered in a humanly perceptible fashion such as a visual presentation including but not limited text display, video display and aural audio output that can be perceived the installation personal performing the retrofit, remove and install on the pedestal crane.

Figure 5:
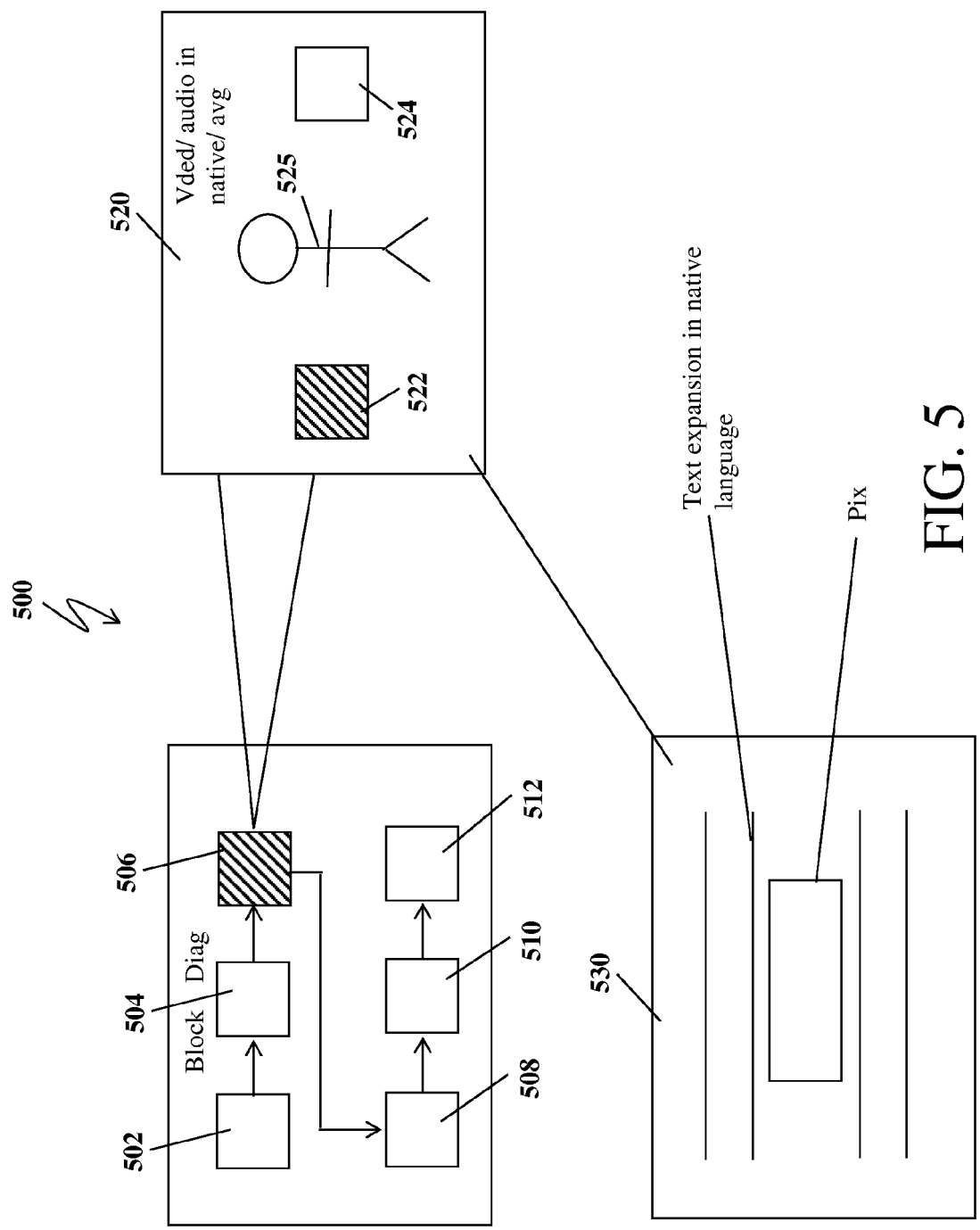
FIG. 5 depicts a particular embodiment of an automated drill down video instruction in an illustrative embodiment of the present invention.

Turning now to FIG. 5, in another embodiment 500, installation instructions are provided on a step by step basis. The retrofit procedure, comprising a series of removal and installation procedure step icons 502, 504, 506, 508, 510 and 512 are presented on a display for the auxiliary crane processor. An operator selects a step icon 506 in the process and a video 520 is displayed on the display for the auxiliary crane processor. The video explains how to perform the selected retrofit step in the removal and installation process. The operator can select an object 522 in the video 520 to enter a textual display 530 of the process step specifically related to the video object describing the retrofit remove and install instructions for the equipment identified in the video object.

Figure 6:
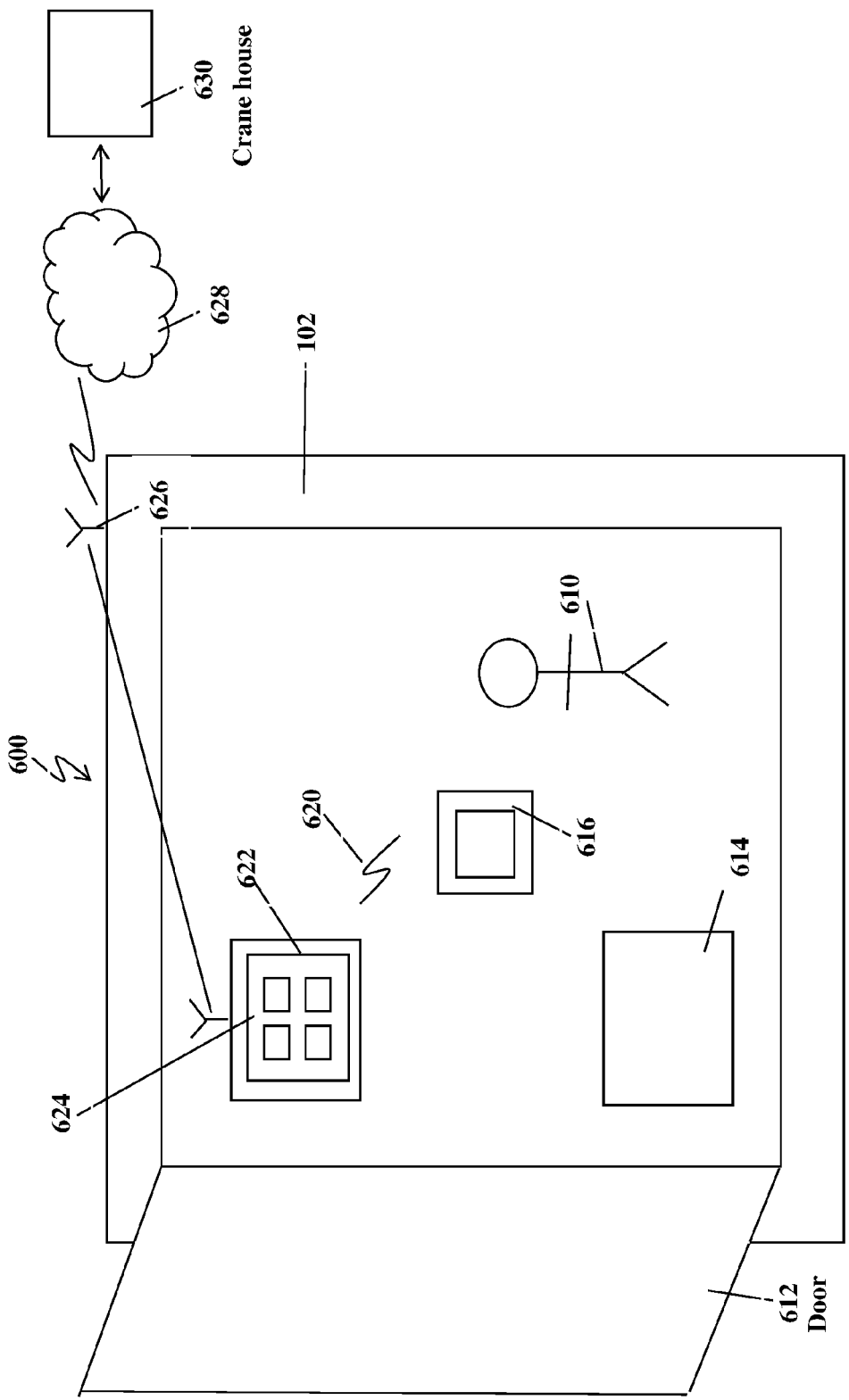
FIG. 6 depicts a particular embodiment of an automated drill down instruction manual using image recognition an illustrative embodiment of the present invention.

Turning now to FIG. 6, in another embodiment, an operator 610 enters a door 612 into crane housing 102 and uses a camera 616 to take a picture of an equipment 614 installed inside of the crane housing 102. The picture is transmitted over a wireless 620 connection to the crane auxiliary processor 622. A computer program embedded in the auxiliary crane processor computer readable medium performs image recognition to identify the equipment in the picture and presents a series of steps 624 in the retrofit procedure explaining how to remove and replace the identified equipment, comprising a series of removal and installation regarding the specific retrofit procedure for the equipment identified in the picture. In another embodiment the picture is transmitted over a wireless connection to a cloud computer such as commercially available cloud storage over the internet where the picture is processed by a cloud computer. A computer program embedded in a cloud computer readable medium performs image recognition to identify the equipment in the picture and displays a series of steps in the retrofit procedure, comprising a series of removal and installation regarding the specific retrofit procedure for the equipment in the picture, comprising a series of removal and installation for the equipment in the picture.

The retrofit procedure is displayed on the auxiliary crane computer display, comprising a series of removal and installation takes the operator through the entire procedure of retrofitting your crane. From identifying the equipment the operator is currently working with, where the operator is in the retrofit process, how to remove and install the equipment in step by step video including audio or textual display in a selectable native language of the operator from start to finish. The installation process instructions are programmed and tested at the factory. The installation instruction provide information to the operator on how to commission the crane after the retrofit has been completed.

The foregoing examples of illustrative embodiments are for purposes of example only and is not intended to limit the scope of the invention. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a non-transitory machine readable storage medium containing instructions, so that a device connected to a network environment can send or receive voice, video or data, and to communicate over the network using the instructions. The instructions may further be transmitted or received over a network via the network interface device. The non-transitory machine readable storage medium may also contain a data structure for containing data useful in providing a functional relationship between the data and a machine or computer in an illustrative embodiment of the disclosed system and method.

While the non-transitory computer-readable storage medium is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for lowering a load on a direct current hoist motor during an electrical power interruption to the direct current hoist motor, the method comprising:
   determining in a crane processor that an electrical power interruption to the direct current hoist motor has occurred; and
   providing a brake assist current to a shunt field on the direct current hoist motor to produce a counter torque in the direct current hoist motor;
   electrically connecting a variable resistance brake assist resistor in series with a dc power supply and the shunt field wherein a brake assist resistance value for the variable resistance brake assist resistor is controlled by the crane processor; and
   varying the brake assist resistance value proportionately to a measured hoist hook speed to proportionately increase the brake assist value to proportionately provide counter torque with an increase in hoist hook speed.

2. The method of claim 1, the method further comprising:
   electrically connecting a brake assist resistor in series with a dc power supply and the shunt field.

3. The method of claim 2, wherein an accelerometer measures hoist hook speed.

4. The method of claim 3, the method further comprising:
   placing a braking resistor across a pair of electrical terminals on the hoist motor to create a counter torque in the hoist motor wherein the counter torque opposes a torque of a freewheeling hoist motor with an attached load.

5. The method of claim 4,
   sensing a first normally open switch limit switch and a second normally closed limit switch.

6. A system for lowering a load on a direct current hoist motor during an electrical power interruption, the system comprising:
   a crane auxiliary processor in data communication with a non-transitory computer readable medium;
   a computer program embedded in the non-transitory computer readable medium, the computer program comprising instructions that when executed by a computer, perform functions, the computer program further comprising:
   instructions to determine that the electrical power interruption has occurred;
   instructions to electrically connect a brake assist resistor in series with a dc power supply and the shunt field; and
   instructions to provide a brake assist current to shunt field on the direct current hoist motor to produce a counter torque in the hoist motor wherein the brake assist resistor is a variable resistance resistor wherein a brake assist resistance value is controlled by the crane processor, the method further comprising:
   instructions to vary the brake assist resistance value proportionately with a measure hoist hook speed to proportionately increase the counter torque with an increase in hoist hook speed.

7. The system of claim 6, the computer program further comprising:
   instructions to electrically connect a brake assist resistor in series with a dc power supply and the shunt field.

8. The system of claim 7, wherein the brake assist resistor is a variable resistance resistor wherein a brake assist resistance value is controlled by the crane processor, the method further comprising:
   instructions to vary the brake assist resistance value proportionately with a measure hoist hook speed to proportionately increase the counter torque with an increase in hoist hook speed.

9. The system of claim 8, the computer further comprising:
   instructions to send a command to a braking resistor relay to electrically a braking resistor across the terminal of the hoist motor to create a counter torque in the hoist motor wherein the counter torque opposes the torque of a freewheeling hoist motor with an attached load.

10. The system of claim 9, wherein the braking resistor is a variable resistance resistor wherein a braking resistor resistance value is controlled by the crane processor, the computer program further comprising:
   instructions to vary the braking resistor resistance value proportionately with a measure hoist hook speed to proportionately increase the counter torque with an increase in hoist hook speed.

* * * * *